May 5, 1936.     E. C. HORTON     2,039,716
WINDSHIELD CLEANER BLADE
Filed April 5, 1934
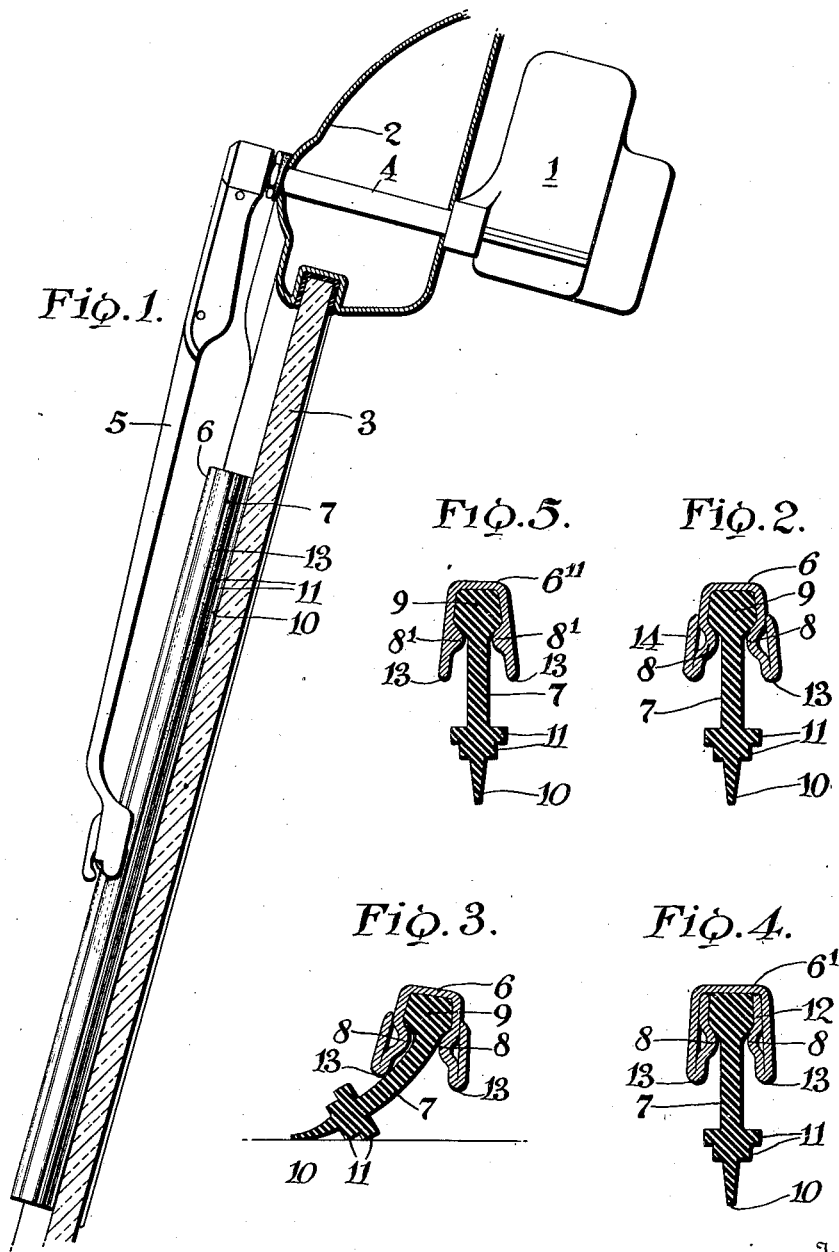
Inventor
Erwin C. Horton,
By Bean & Brooks. Attorneys Patented May 5, 1936

2,039,716

UNITED STATES PATENT OFFICE 2,039,716

WINDSHIELD CLEANER BLADE

Erwin C. Horton, Hamburg, N. Y., assignor to Trico Products Corporation, Buffalo, N. Y.

Application April 5, 1934, Serial No. 719,196

5 Claims. (Cl. 15—245)

This invention relates to a wiper blade for windshield cleaners.

Generally, the present day wiper blade consists of a channeled metal holder in the channel of which is secured a rubber body for wiping contact with the windshield glass. The sides of the channel are clamped against the inserted rubber body and thereby define a line of bend for the projecting portion of the body. When clamped against the body the sides embed in the rubber and tend to weaken the same along the line of bend. Furthermore, the sides extend down over the body for quite some distance in order to obtain a firm grip on the body, and since it is desirable to have the body project a sufficient distance to afford the desired resiliency and yieldability for a good wiping contact with the glass the overall dimensions of the blade are made so large that the air currents passing over the windshield when driving the vehicle at high speed will cause the blade to chatter on the glass and even lift the blade from the glass.

The present invention has for its object to provide a wiper blade which is more efficient and uniform in performing its function and, further, one which may be manufactured with smaller dimensions and thereby obviate the undesirable wind movements of the blade when driving the vehicle at high speeds.

In the drawing:

Fig. 1 is a fragmentary sectional view of a windshield having a windshield cleaner mounted thereon and equipped with a wiper blade embodying the present invention.

Fig. 2 is a cross sectional view through the wiper blade.

Fig. 3 is a similar view but depicting the wiper blade in action.

Figs. 4 and 5 are slightly modified forms of the invention.

Referring more particularly to the drawing, the numeral 1 designates a windshield wiper drive, depicted as a motor, mounted in the header construction 2 which frames the windshield glass 3, the shaft 4 of the windshield cleaner motor being equipped with a blade carrying arm 5 for moving the wiper blade over the glass.

The wiper blade according to the present invention, comprises a channel member or holder 6 having a wiping body of rubber (this term being inclusive of other desired material) secured in the channel of the holder 6 in such manner that its line of bend is disposed well up within the channel. This permits the body to have the desired dimensions for greater yieldability and at the same time provide for a blade of smaller dimensions.

The wiping body has an anchoring base in the form of a bead 9 from which extends a web 7 of reduced thickness. The base is firmly anchored in the holder channel, and the web swings back and forth on the base along the line of its juncture therewith.

Projecting inwardly from the inner walls of the holder channel, and set back therein, are opposed shoulders or ribs 8 which overhang the base but preferably stop short of the web 7 so as to give the latter freedom of movement on the base. These ribs 8 snugly embrace the base at opposite sides of the juncture of the web therewith and firmly secure the base against rocking movement in the channel. The bottom wall of the holder channel serves as a jaw against which the base is clamped by the joint action of the ribs 8. The web, however, is slightly spaced from the ribs so that it may swing back and forth from its point of anchorage on the base without hindrance or obstruction. The hinging action of the web is therefore wholly resilient and unrestrained by a direct contact with the holder, and since the point of resilient anchorage for the web is well up within the holder channel the projecting portion of the rubber body may be increased without increasing the overall dimension of the blade.

In fact, the holder may have its walls decreased in size. Accordingly, the channel walls are extended but slightly beyond the ribs to serve as guards for the anchorage and their outer edges 13 will serve as stops should the carrying arm 5 bear heavily on the blade. It is, however, preferred to have the web 7 out of substantial contact with both the ribs as well as the stop edges 13 when the blade is in action, since such contact, if of a substantial nature, will shorten the leverage or transfer the point of swing for the web from the base to such rib or edge (whichever is last contacted), and this, in turn, will decrease the yieldableness in the wiping edge and consequently alter the uniform wiping of the windshield glass.

The outer or wiping edge of the inserted body is attenuated to a feather edge for lapping lightly on the glass. Adjacent this feather edge 10, and projecting laterally from each side of the web of the inserted body are one or more shoulders 11 which are more substantial in character and are designed for form wiping contact with the glass. The shoulders 11 are disposed closer to the anchoring base and provide wiping edges which are comparatively stiffer than the feather edge 10, and, in wiping action, precede the lapping edge 10 so as to remove the major portion of the moisture from the glass, and this being followed by the more flexible feather edge 10 which laps under a light pressure to smooth out the remaining film of moisture, the glass will be left exceedingly clear for the utmost visibility therethrough. With the web of the body swinging through a definite arc about its line of anchorage to the base the leverage is substantially constant so that the pressure in the wiping contact will be substantially uniform and the wiping edge will possess greater resiliency and yieldability, being composite in character by having a firm initial wiping contact and a trailing finishing touch light enough to smooth out the remaining film of moisture. The outer edge portions of the channel walls may be bent backwardly upon the outer faces of the walls, as at 14, to give reinforcement to the blade. The ribs 8 may be provided on plates 12 inserted in the channel member 6', as shown in Fig. 4, wherein the plates 12 constitute inturned extensions of the side walls, or the holder 6" may be cast with the ribs 8' thereon, as in Fig. 5.

What is claimed is:

1. A wiper blade for windshield cleaners, comprising a channeled holder having opposed side walls with internal ribs set inwardly from their outer edges, and a wiping body inserted in the channel of the holder and having an anchoring base over which the opposed ribs engage, said anchoring base being relatively large with respect to a projecting portion of the body, said projecting portion being yieldable laterally along its line of juncture with the base, the side walls outwardly beyond the ribs together with the ribs being spaced from the projecting body portion and defining the extent of flexibility of said body portion.

2. A wiper blade for windshield cleaners, comprising a channeled holder having opposed side walls with internal ribs, the outer edge portions of the walls beyond the ribs being folded outwardly and back upon the side walls to reinforce the holder, and a wiping body of strip like form inserted in the channel of the holder and having along one edge an anchoring base over which the ribs extend to secure the body within the channel, said anchoring base being relatively large with respect to a projecting portion of the body extending from said anchoring base outwardly between the ribs and walls of the holder and in spaced relation therewith.

3. A wiper for windshield cleaners, comprising a channeled holder having bendable side walls with internal ribs set inwardly from the outer edges of the walls, and a wiping body having a relatively large head with respect to a flexible portion extending therefrom, said ribs retaining said head within said channel and being spaced from the flexible portion, and said side walls being spaced from said flexible portion; whereby said flexible portion is rockable back and forth from the juncture of said flexible portion and said head independently of supporting contact with said side walls of the holder.

4. A wiper for windshield cleaners comprising a flexible strip having a wiping edge and an enlarged marginal attaching portion, and a channeled holder having a strip receiving and embracing portion firmly embracing the attaching portion of the strip exclusively, the side walls of said holder outwardly and immediately beyond the strip receiving and embracing portion being abruptly offset away from and in spaced relation to the strip to leave the latter free for bodily flexing from its attaching portion independently of supporting contact with the offset side walls of the channeled holder.

5. A wiper for window cleaners comprising a flexible strip having a wiping edge along one margin and an enlarged anchoring portion along the opposite margin, and a channeled holder receiving the anchoring portion, the walls of the channeled holder being formed with inwardly extending parts which firmly embrace the anchoring portion of said strip and are spaced from the remaining portion of the strip to give the same freedom of flexing from the anchoring portion independently of supporting contact with said parts.

ERWIN C. HORTON.